United States Patent [19]

Flakus et al.

[11] 4,184,989

[45] Jan. 22, 1980

[54] THERMALLY LINKABLE AQUEOUS POLYURETHANE DISPERSIONS

[75] Inventors: Werner Flakus, Recklinghausen; Josef Disteldorf, Herne, both of Fed. Rep. of Germany

[73] Assignee: Veba-Chemie Aktiengesellschaft, Gelsenkirchen-Buer, Fed. Rep. of Germany

[21] Appl. No.: 718,233

[22] Filed: Aug. 30, 1976 (Under 37 CFR 1.47)

[30] Foreign Application Priority Data

Aug. 29, 1975 [DE] Fed. Rep. of Germany ....... 2538484

[51] Int. Cl.² .......................... C08J 3/10; C08L 75/06
[52] U.S. Cl. ............................. 260/29.2 TN; 528/61
[58] Field of Search .................. 260/29.2 TN, 75 NT, 260/75 NH, 75 NP, 75 NK, 75 NE; 528/61

[56] References Cited

U.S. PATENT DOCUMENTS

| | | | |
|---|---|---|---|
| 3,248,370 | 4/1966 | Reischl et al | 260/75 NT |
| 3,903,032 | 9/1975 | Matsuda et al. | 260/75 NK |
| 3,923,743 | 12/1975 | Quiring et al. | 260/75 NT |
| 3,989,662 | 11/1976 | Schmitt et al. | 260/75 NT |
| 4,012,349 | 3/1977 | Matsuda et al. | 260/29.2 TN |
| 4,044,171 | 8/1977 | Müller et al. | 260/75 NT |

FOREIGN PATENT DOCUMENTS

1934763  1/1971 Fed. Rep. of Germany.

Primary Examiner—Allan Lieberman
Attorney, Agent, or Firm—Sprung, Felfe, Horn, Lynch & Kramer

[57] ABSTRACT

An improvement in a process for the preparation of a solvent-free exclusively aqueous dispersion of a thermally linkable, storage stable, light stable polyurethane obtained by the reaction of a hydroxy group containing polyester composition and a diisocyanate in a ketonic solvent at 10°–50° C. employing the hydroxyl containing polyester and diisocyanate in amounts such that there are 1.5–2.0 NCO equivalents per OH group and the reaction product is thereafter reacted with a primary diamine, secondary diamine or diol in such an amount that 30–70% of the existing free NCO groups on said reaction product are reacted and the resultant reaction product is dispersed in water and said ketonic solvent is removed. The invention resides in that one uses as diisocyanate the uretdione of the 3-isocyanatomethyl-3,5,5-trimethylcyclohexyl-isocyanate.

2 Claims, No Drawings

THERMALLY LINKABLE AQUEOUS POLYURETHANE DISPERSIONS

BACKGROUND OF THE INVENTION

Field of the Invention

Described in the literature are examples of aqueous polyurethane dispersions which form film at room temperature, of cationic, anionic or non-ionogenic kind. The characteristic picture of these dispersions is very diverse with interesting physical properties and application-technical possibilities.

The chemical resistance and weather stability of dispersion films drying exclusively physically at room temperature, as well as also at higher temperature, can now still be improved in comparison with polyurethane reaction lacquers containing solvents.

In the case of cationic polyurethane dispersions whose technical preparation requires a number of process steps, acid catalyzed after-linkages can be conducted with hydroxyl-containing hardeners. However, the precursors of the resulting films cannot be considered totally satisfactory.

Anionic polyurethane dispersions, which are more easily accessible commercially, cause some difficulties with regard to a later after-linkage since in the alkaline field smoothly proceeding reactions without discolorations in tolerable temperature ranges are not yet known.

SUMMARY OF THE INVENTION

Surprisingly, it was now discovered that one can produce on the basis of hydroxy-containing polyethers or oxy esters of linear as well as also branched structure with derivatives of the isophoronediisocyanate (3-isocyanatomethyl-3,5,5,-trimethylcyclohexyl-isocyanate/IPDI) partially capped by NCO in first of all organic Uretdionisocyanate adducts, which can be converted in the simplest manner into aqueous dispersions and can be thermally linked.

The subject matter of the invention is an improvement in a process for the preparation of a solvent-free exclusively aqueous dispersion of a thermally linkable, storage stable, light stable polyurethane obtained by the reaction of a hydroxy group containing polyester composition and a diisocyanate in a ketonic solvent at 10°–50° C. employing the hydroxyl containing polyester and diisocyanate in amounts such that there are 1.5–2.0 NCO equivalents per OH group and the reaction product is thereafter reacted with a primary diamine, secondary diamine or diol in such an amount that 30–70% of the existing free NCO groups on said reaction product are reacted and the resultant reaction product is dispersed in water and said ketonic solvent is removed. The invention resides in that one uses as diisocyanate the uretdione of the 3-isocyanatomethyl-3,5,5,-trimethylcyclohexyl-isocyanate. In some cases said uretdione is used in mixture with monomeric diisocyanate and one adds during the dispersion of the reaction product or thereafter polyhydroxyl compounds in such amounts that both NCO groups capped or terminated in the uretdion ring receive one OH group each.

The characteristic picture of the polyurethane dispersion film producible in this manner is outstanding and permits a direct comparison with the known quality picture of polyurethane films resulting from solvent-containing polyurethane reaction lacquers.

The isophoronediisocyanate derivative advantageously used for the reaction is an addition product of isophoronediisocyanate with itself, the corresponding uretdion, which is prepared according to German OS No. 1,934,763, the disclosure of which is hereby incorporated herein by reference. It has the following formula

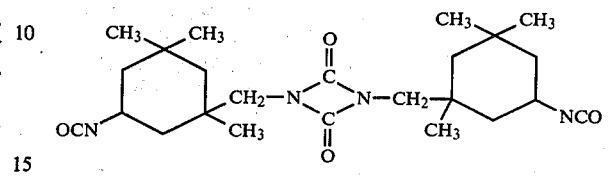

N,N'-bis-(1,3,3-trimethyl-5-isocyanatomethylcyclohexyl)-1,3-diaza-2,4-dioxo-cyclobutane.

The average chemical composition of commercially produced uretdione is as follows:

<1 T. IPDI
85 T. dimeric IPDI (Uretdione)
15 T. trimeric IPDI (Triisocyanurate)

By reaction of hydroxyl-containing polyethers or polyesters (especially those containing tin) of average molecular weights of 500–3.000, preferably those within the range of 1.000–2.000, with IPDI-uretdione of commercial purity or mixtures of IPDI with IPDI-uretdione in ketonic solvents such as acetone, methylethyl ketone and others at room temperature, one obtains storageable adduct solutions which can also be added to a later subsequent treatment.

For the production of the aforementioned adducts, the reaction partners are reacted in the equivalence ratio of OH/NCO=1:1.5–1:2, preferably of 1:2. The adducts now prepared in this manner still contain free as well as capped or terminated NCO-substituents.

Finally, the ketonic adduct solutions are submitted to a chain-extension with diols or diamines, especially 3-aminomethyl-3,5,5-trimethylcyclohexylamine and dispersed in a manner known per se with any anionacting tenside surface acting substance—i.e., for instance, all salts of monoaminoacids known for this purpose in the simplest case with sodium aminocapronate as well as water. In this manner, all the free NCO substituents are converted into corresponding urethane or urea compounds.

Equivalent amounts of NCO-reactive compounds can be added there to the water necessary for the dispersion, which can react with the capped NCO groups during a later thermal subsequent linkage. Polyamino compounds or polyhydroxy compounds of the most diverse kind can be used. However, according to experience one can also add the NCO reactive substituents required for a later linkage, for instance, directly prior to the chain extension or, however, also only directly prior to application. The characteristic picture of the lacquer films finally resulting is not influenced by the point of time of this addition. After distillative removal of the ketonic substituents there result from this reaction scheme aqueous polyurethane dispersions of excellent properties.

As properties of the polyurethane dispersions prepared according to the instant invention and especially of the resulting coatings the following should be mentioned:

1. Extensive stability against especially polar solvents, acids and alkali solutions.

2. Surface hardnesses which should be classified within the area of the solvent-containing PUR-reaction lacquers. (I.e. according to DIN 53 157).

3. High blocking temperatures, as a rule 150°–200° C.

4. High stability against hot water as well as good sterilibility (sterilizing ability) (2 h, 121° C.).

To a special degree these dispersions are suitable for being used as solvent-free systems for appropriate metal annealing lacquerings. However, these dispersions can also be used for the coating of other substrates which permit a sufficient temperature requirement, i.e. of 10 minutes 150°–180° C. As such there should still be mentioned pressboard, PVC, polyurethane and similar materials.

Examples for the preparation of the dispersions claimed according to the instant invention:

EXAMPLES

DISPERSION 1

(1A.) Adduct formation:

1.000 g oxy ester on the basis of 50 parts by weight adipic acid, 21 parts by weight hexandiol-(1.6) and 30 parts by weight neopentyl glycol (OH number: 144 mt KOH/g) were reacted qith 1.220 g uretdione of the IPDI (commercial quality) and 952 g acetone while stirring at room temperature within four to five hours into a 70% adduct solution. NCO number of the solution: 3.4%.

(1B.) Dispersion:

400 g adduct 1A were reacted after dilution with 300 g acetone with 14 g 3-aminomethyl-3,5,5-trimethylcyclohexyl amine (isophoronediamine) and then dispersed while stirring with 41 g of a 30% aqueous solution of the sodium salt of the aminocaproic acid, as well as 27 g trimethylolpropane and 380 g water, then stripped free of acetone.

The resulting dispersion has a solid content of about 45%.

| | AFTER HARDENING in 15–10 minutes at 150–180° C. |
|---|---|
| Impact stress according to Konig | 141 sec. |
| Hardness according to Bucholz | 91 |
| Erichsen cupping | 11.2 mm |
| grid section | 0 |
| Blocking temperature | 165° C. |
| TENSILE strength | 409 kp/cm$^2$ |
| tension | 8 % |
| foil thickness | 49 μ |

DISPERSION 2

(2A.) Adduct formation:

As described under 1A.

(2B.) Dispersion:

400 g adduct 1A were reacted after dilution with 300 g acetone with 14 g isophoronediamine and then dispersed with 41 g of a 30% aqueous solution of the sodium salt of the aminocaproic acid as well as 62 g polyester of the basis phthalic acid-trimethylolpropane (OH number: 538 mg KOH/g), and 420 g water according to the specification for 1B and finished.

The resulting dispersion has a solid content of about 45%.

| | AFTER hardening within 15–10 minutes at 150–180° C. |
|---|---|
| Impact strength according to Konig | 131 sec. |
| Hardness according to Buchholz | 111 |
| Erichsen cupping | 10.6 mm |
| grid section | 0 |
| Blocking temperature | 165° C. |
| Tensile strength | 510 kp/cm$^2$ |
| tension | 8% |
| foil thickness | 64 μ |

DISPERSION 3

(3A.) Adduct formation:

1.000 g oxy ester based on adipic acid-2,2,4-trimethylhexandiol (OH number: 100 mg KOH/g) were reacted with 855 g uretdione as well as 795 g acetone according to the specification according to 1A for the adduct formation 3A. NCO number of the solution: 2.85%.

(3B.) Dispersion:

400 g adduct 3A were dispersed after dilution with 300 g acetone with 11.5 g isophoronediamine and then dispersed with 35 g of a 30% aqueous solution of sodium salt of the aminocaproic acid as well as 22.5 g trimethylolpropane and 372 g water according to the specification for 1B and finished.

The resulting dispersion has a solid content of 45%.

| | AFTER hardening within 10–15 minutes at 150–180° C. |
|---|---|
| Impact strength according to Konig | 150 sec. |
| Buchholz hardness | 83 |
| Erichsen cupping | 11.5 mm |
| grid section | 0 |
| Blocking temperature | 180° C. |
| Tensile strength | 268 kp/cm$^2$ |
| tension | 104 |
| foil thickness | 61 μ |

DISPERSION: 4

(3A.) Adduct formation:

417 g oxy ester (see Example 1) and 583 g oxy ester (see Example 5) were reacted with 855 g uretdione as well as 795 g acetone according to the specification according to 1A for the adduct formation 4A. NCO content of the solution: 2.85%

(4B.) Dispersion:

400.0 g adduct 3A were reacted after dilution with 300 g acetone with 11.6 g isophoronediamine and then dispersed with 34.7 g of a 30% aqueous solution of sodium salt of the aminocaproic acid as well as 52.0 g polyester on the basis phthalic acid-trimethylolpropane (OH number: 538 mg KOH/g), and 408.0 g water according to the specification for 1B.

The resulting dispersion has a solid content of about 45%.

| | After hardening within 15–10 Minutes at 150–180° C. |
|---|---|
| Impact strength according to Konig | 114 sec. |
| hardness | 91 |
| cupping | 11.7 mm |
| grid section | 0 |
| Blocking temperature | 155° C. |
| tensile strength | 330 kp/cm² |

| | After hardening within 10–15 minutes at 150–180° C. |
|---|---|
| Impact strength according to Konig | 28 sec. |
| hardness | 83 |
| cupping | 11.5 mm |
| grid section | 0 |
| Blocking temperature | 220° C. |
| tensile strength | 176 kp/cm² |
| tension | 252 % |
| foil thickness | 85 μ |

COMPARISON TESTS TO EXAMPLES OF THE INSTANT APPLICATION

A. Stability to Solvents
(Method: drop test, evaluation of the effect after 15 seconds)

| | Acetone | Methanol | Xylene | Methylethylketone |
|---|---|---|---|---|
| Dispersion according to DOS 2,325,825 Example 1 | strongly affected | weakly affected | no effect | strongly affected |
| Dispersion according to P 2 325 825 Example 2 | strongly affected | weakly affected | no effect | strongly affected |
| Example 2 of the instant application | no effect | no effect | no effect | no effect |
| Example 4 of the instant application | no effect | no effect | no effect | no effect |

B. Hot water resistance

| | Erlenmeyer Test; 10 minutes Steam effect 100° C. | Sterilization Test 2 hours at 121° C. |
|---|---|---|
| Dispersion according to DOS 2,325,825 Example 1 | Blushing of the coating; partial loss of adhesiveness | coating destroyed |
| Dispersion according to P 2 325 825 Example 2 | Blushing of the coating; partial loss of adhesiveness | coating destroyed |
| Example 2 of the instant application | no change | no change |
| Example 4 of the instant application | no change | no change |

| tension | 36 % |
|---|---|
| foil thickness | 68 μ |

DISPERSION 5

(5A.) Adduct formation:

1.000 g oxy ester of the basis of 50 weight parts adipic acid, 31 weight parts hexanediol (1.6) and 14 weight parts neopentyl glycol (OH number: 68.5 mg KOH/g) were reacted with 426.2 g of a mixture of isophoronediisocyanate and uretdione (NCO content: 24%) as well as 611 g acetone according to the specification for 1A for the adduct formation 5A.

(5B.) Dispersion:

400.0 adduct 5A were dispersed after dilution with 300 g acetone with
10.2 isophoronediamine and then dispersed with
31 g of a 30% aqueous solution of sodium salt of the aminocaproic acid as well as
21.0 g polyester based on adipic acid-trimethylolpropane (OH number: 593 mg KOH/g), and
370.0 g water according to the specification for 1B and finished.

The resulting dispersion has a solid content of about 45%.

What is claimed is:

1. In a process for the preparation of a solvent-free exclusively aqueous dispersion of a thermally linkable, storage stable, light stable polyurethane wherein:
   (a) a hydroxy group containing polyester composition is reacted with a diisocyanate in a ketone solvent at 10°–50° C.;
   (b) employing the hydroxy containing polyester and diisocyanate in amounts such that there are 1.5–2.0 NCO equivalents per OH group to obtain an intermediate reaction product;
   (c) the intermediate reaction product is thereafter reacted with a primary diamine, secondary diamine or diol in such an amount that 30–70% of the existing free NCO groups on said reaction product are reacted and the resultant reaction product is dispersed with an anionic tenside surfactant in water and said ketone solvent is removed;

the improvement which comprises employing as the diisocyanate the uretdione of 3-isocyanatomethyl-3,5,5-trimethylcyclohexyl isocyanate.

2. A process according to claim 1 wherein said uretdione has the formula:

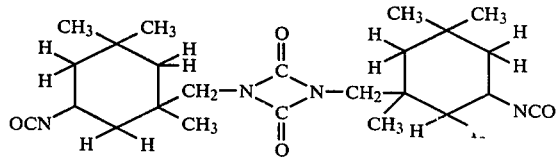

* * * * *